Feb. 17, 1970  HIDEYA KOBAYASHI  3,495,367
PRECAST LIGHTWEIGHT REINFORCED CONCRETE PLANK
Filed Dec. 19, 1966  10 Sheets-Sheet 1

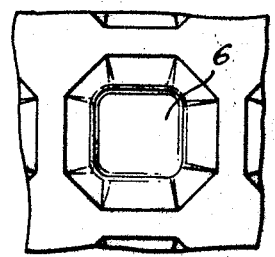
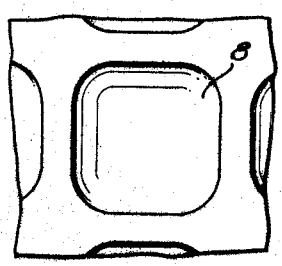
Fig. 5     Fig. 8
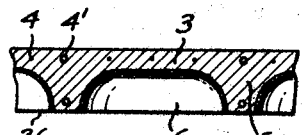
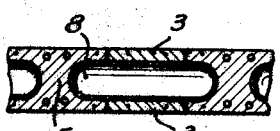
Fig. 6     Fig. 9
Fig. 7     Fig. 10
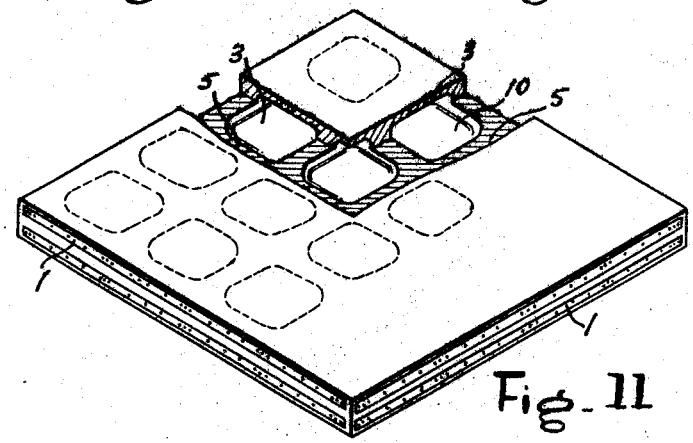
Fig. 11

Feb. 17, 1970  HIDEYA KOBAYASHI  3,495,367
PRECAST LIGHTWEIGHT REINFORCED CONCRETE PLANK
Filed Dec. 19, 1966  10 Sheets-Sheet 7

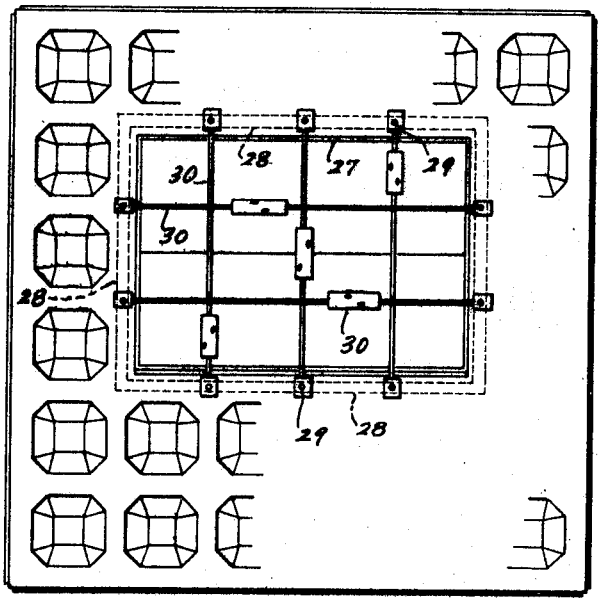
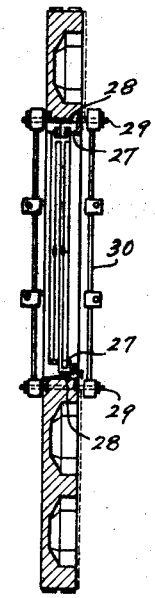
Fig. 31  Fig. 32
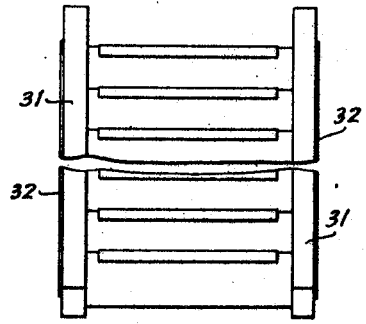
Fig. 33

United States Patent Office 3,495,367
Patented Feb. 17, 1970

3,495,367
PRECAST LIGHTWEIGHT REINFORCED CONCRETE PLANK
Hideya Kobayashi, 14–14 1-chome, Nagasaki, Toshima-ku, Tokyo, Japan
Filed Dec. 19, 1966, Ser. No. 602,604
Claims priority, application Japan, Dec. 21, 1965, 40/78,347; July 11, 1966, 41/44,830; Aug. 19, 1966, 41/54,199; Aug. 23, 1966, 41/55,030
Int. Cl. E04c 3/26, 2/50; E04b 2/26
U.S. Cl. 52—223                          20 Claims

ABSTRACT OF THE DISCLOSURE

A cast slab having a plurality of rows of recesses formed therein which define intersecting solid rib sections which extend between opposite edges of the slab and pre-stressed tensile reinforcement elements in the rib sections extending the entire length thereof and connected at their ends to connection elements secured in recessed notches at the lateral edges of the slab. The connection elements serve to apply pre-stress to the reinforcement elements; to lift the slab; to connect the slab with similar slabs; and to resist bending moment of the rib sections.

---

The present invention relates to lightweight concrete slabs of a predetermined thickness having parallel outer surfaces provided with hollow or recessed portions interrupted by a plurality of lattice-like ribs.

Mort particularly, the present invention relates to lightweight concrete slabs of the above type which are reinforced by a plurality of pre-stressed high tensile strength wires which are stretched between parallel anchor plates engaging the opposite ends of each wire.

In accordance with the invention, the recesses can be formed by hollow concrete blocks, constituted by pairs of pre-cast concrete pieces of the same shape, removable forms, hollow permanent forms, or inflatable forms. The permanent forms are lightweight and can be made from insulating materials. The concrete blocks can also be of light gravel and sand, such as pumice or expanded aglite, etc. The forms are arranged in the spaces between said ribs, and concrete is poured. The concrete is steam cured and thereafter the applied tensile force to the wires is released.

The slabs of the present invention are assembled as the walls, floors or roofs of buildings, according to well-known systems of wall construction or box frame construction, by utilizing the anchoring plates of the slabs which serve as external connection means. The anchoring plates can be continuous or they can be spaced at regular fixed intervals. The anchoring plates of the slabs to be jointed can be connected by conventional methods of steel assembly such as by welding, rivetting or bolting. The anchoring plates may be connected directly or by use of intermediate connecting members such as plates or angles, etc. The slabs can be connected horizontally or vertically in the fixed intervals to form the walls or floors of the building.

In the event that there is a need for an opening in the slab such as, for a window, door, staircase, elevators, several forms for recesses are omitted, and a frame which can be reinforced is substituted.

The main object of the present invention is to provide a prefabricated lightweight reinforced concrete slab with a plurality of pre-stressed reinforcing members extending in different directions, for use as walls and floors of various structures. The conventional type of such slabs do not use anchoring plates. According to the present invention, as above described, the anchoring plates are placed at the edges of the slabs and the reinforcing members extend between the anchoring plates in different directions.

These anchoring plates may also be used to be engaged by the hooks of a crane or derrick to transport the slab.

The pre-stress of the reinforcement wires in the slab will resist the weight of the slab when it is lifted and thereby prevent the existence of any small cracks.

Another object of the present invention is to provide novel and single connecting methods for the anchoring plates of slabs to be connected together to enable assembly of the slabs as walls and floors.

In the slab according to the invention, the hollow recesses are formed between the ribs, whereby the slab is very light in weight when compared to conventional slabs.

The present invention is also directed to the manner of forming of the recesses. Thus, these may be formed according to the invention by assembled pre-cast pieces which are cast integrally in the slab. The hollows in the pieces may be separated into isolated chambers to prevent air circulation. Additionally, insulation boards may be mounted between the assembled pieces to prevent conduction of heat or sound and thereby confer on the slabs an effective capability as regards heat and sound insulation.

Alternatively the hollows or the recesses of the slabs may be used to promote the air circulations for the air conditioning purposes. In this case the plurality of the holes are drawn through the webs of the ribs of the slabs, and the recesses are covered air-tightly and may be used as air ducts.

In further accordance with the present invention, the shape of the anchoring plates at the edges of the slab is of great importance. The ends of the reinforcement wires in the ribs are generally placed in two horizontal lines in the ribs. To render the wires effective in resisting bending moments, when the slabs are used as in walls and floors, the anchoring plates are provided with a projecting flange extending perpendicular to the two lines of the reinforcement wires. For this purpose, steel members of channel or T shape are used as the anchoring plates and the flanges of the anchoring plates are disposed perpendicularly to the two said lines of wires.

When the slabs are connected as walls and floors of buildings, the vertical flanges of the anchoring plates are securely connected to each other or sometimes to other types of structures by conventional methods of steel assembly, whereby the pre-stressed wires are coupled together and effectively combine to resist the forces applied to the slabs.

Moreover, the present invention is applicable to such cases in which the vertical flanges described hereinabove are connected not only to the pre-stressed wires but sometimes to conventional steel bars without pre-stress.

These and further objects and advantages of the present invention will become apparent from the following descriptions taking reference to the accompanying drawings, in which:

FIGURE 5 is a plan view of a form which provides a recess in the cast slab;

FIGURE 6 is a sectional view in elevation of a portion of the slab showing one type of form;

FIGURE 7 is a sectional view similar to that of FIG. 6 showing another type of form;

FIGURE 8 is a plan view of a form which is employed when the recess is wholly contained within the slab;

FIGURES 9 and 10 are sectional views in elevation of a portion of a slab with wholly contained recesses therein showing respective embodiments of forms;

FIGURE 11 is a perspective view of a hollow slab partially cut away to show the interior details;

FIGURES 31 and 32 are respective plan and elevation views of a form for a slab which is to have an opening therein;

FIGURE 33 is a front view of a staircase to be used with the slabs according to the invention;

Figure 1:
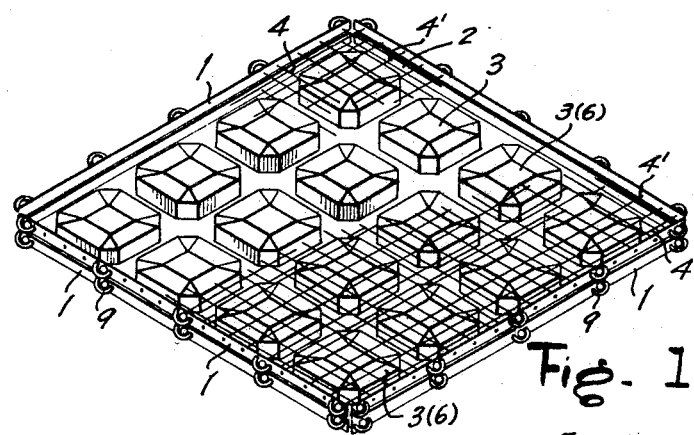
FIGURE 1 is a perspective view of a form which is ready to receive concrete, which when set will provide a cast slab.
Figure 4:
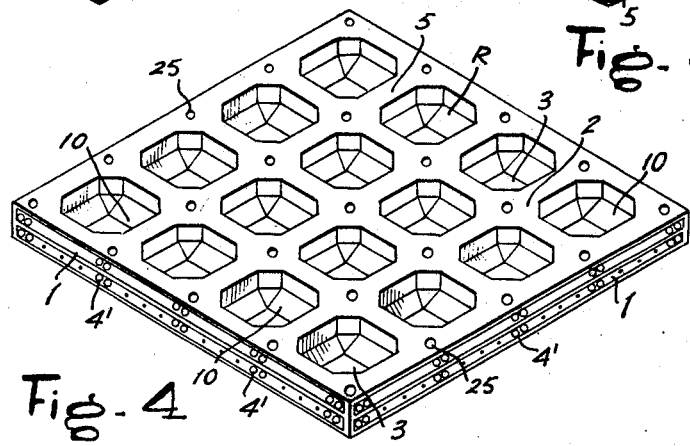
FIGURE 4 is a perspective view of a cast slab.
Figure 14:
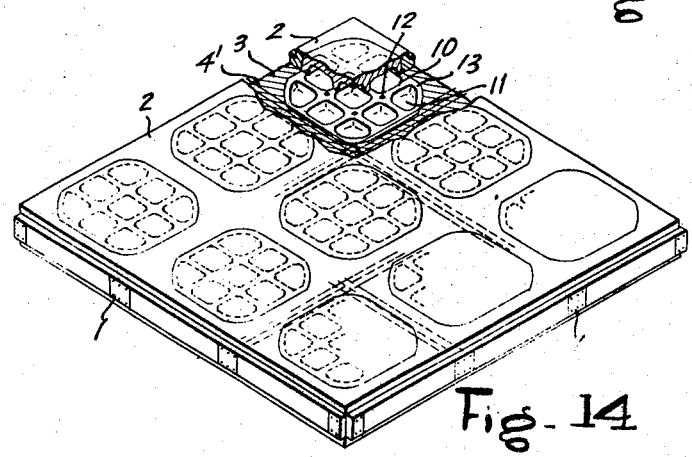
FIGURE 14 is a perspective view of a modified version of the slab of FIG. 12 partially cut away to show the interior construction.
Figure 15:
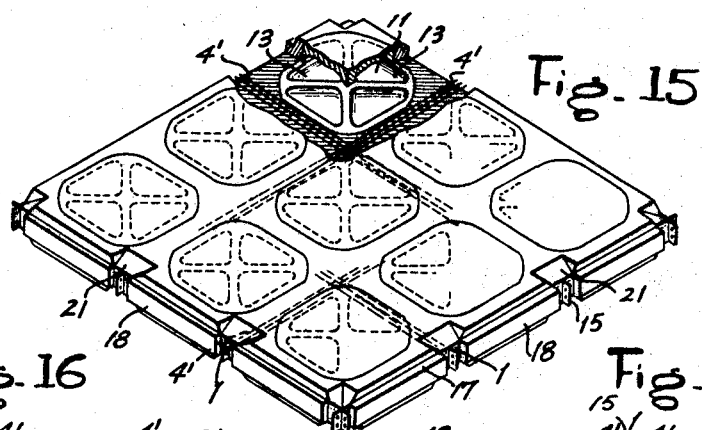
FIGURE 15 is a perspective view of another embodiment of a cast slab.
Figure 16:
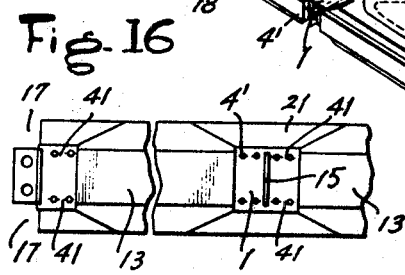
FIGURE 16 is a side elevation view on enlarged scale of a portion of the slab of FIG. 15.
Figure 17:
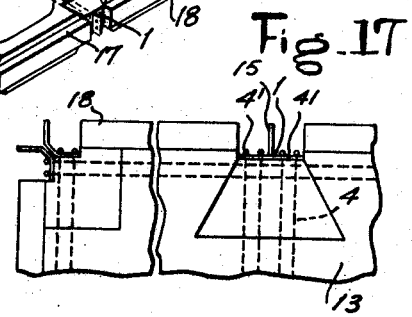
FIGURE 17 is a plan view of the portion shown in FIG. 16.

Referring now to the drawings, particularly to FIGS. 1, 14, 15, therein are shown anchoring plates 1 at the periphery of a slab 2. The slab 2 has a plurality of hollow recesses R and in the thin portion 3 of the slab beneath the recesses R may be placed a number of high strength reinforcing rods or wires 4 of small diameter, as for example, shown in FIGS. 4, 6 and 7. Further reinforcing members 4′ are disposed in the slab 2 and extend from opposite sides thereof in the ribs 5 of full thickness of the slab formed between adjacent lines of recesses. The plates 1 may extend continuously along the borders of the slab when the reinforcing wires 4 are placed in the thin portion 3 of the slab, as shown in FIGS. 1 and 4. When such high strength wires 4 of small diameter are omitted, the plates 1 may be located only at the ends of the ribs 5 as shown in FIGS. 14 and 15.

The reinforcing members 4, 4′ are secured at their ends to the plates 1 with bolts and nuts, or by enlarging the ends of the members 4, 4′ after they have been passed through holes in the plates.

The anchoring plates 1 may be flat bars, angles, channels, T bars or other structural shapes, and they may be constituted by two elements as shown in FIGS. 1 and 4.

Generally, the reinforcing members 4, 4′ are wires of the same length and their ends are fixed to the plates 1 at opposite sides of the slabs, whereby the plates are of an even number.

Figure 2:
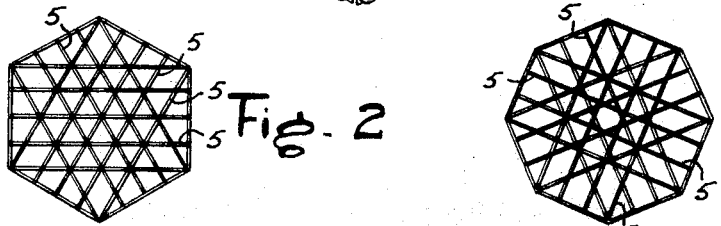
FIGURE 2 and 3 are diagrammatic illustrations in plan of two forms of slabs.
Figure 3:
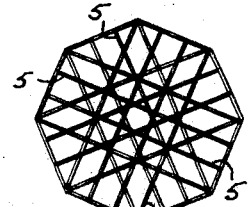

The slabs also have an even number of sides; they may be rectangular as in FIG. 1, hexagonal as in FIG. 3, or octagonal as in FIG. 2.

To strengthen the thin portions 3 of the slab, the ribs 5 are of generally rectangular shape as shown in the drawings, and the wires 4′ are rather large in diameter. The wires 4′ extend parallel to the fine wires 4 in the thin portions 3. Alternatively, wires 4′ may be the same diameter as the wires 4 but in such case the number of wires 4′ in the ribs 5 is increased.

In the ordinary case when the slabs are rectangular, the ribs 5 cross perpendicularly to each other. To form the hollow recesses R between the ribs, there are employed projecting forms 6 having a rim of octagonal shape and a base of rectangular shape. These forms 6 can be made of wood, metal or plastic material such as polyethylene or polyvinylchloride. The forms may also be made inflatable to assume their shape upon being filled with a pressure fluid.

Alternatively, the forms may be made of lightweight insulation material such as polystyrene, and they may be formed as bowls 7 facing downwards as shown in the drawings in FIGS. 6 and 7.

In another embodiment both surfaces of the slabs are the ribs 5 cross perpendicularly to each other. To form formed within the slabs.

For this purpose, as shown in FIGS. 8 to 10, there may be employed octahedron shaped hollow forms 8, or similar inflatable forms, or forms 9 of lightweight insulation material to form the recesses within the slabs.

The forms are supported in suspended manner within the slab forms. When concrete is poured, it is found that sometimes the concrete does not completely fill the thin portions 3 beneath forms 8 and 9.

To overcome this deficiency, thin precast concrete blocks having the same thickness as portions 3 are placed under the forms 8 or 9 to become integrally cast with the slab.

Alternatively, when the concrete is completely poured in the forms, the upper surface of the slab is covered with a plain flat plate. Then the slab is lifted by a crane and turned upside down, and placed on a flat surface and another thin layer of concrete is poured on the now inverted lower surface.

After steam curing, forms 6, 7 for the recesses are removed and the slabs are of the shape as shown in FIG. 4.

When the hollow forms 8 or 9 are used, a slab of the form as shown in FIG. 11 is obtained, wherein some parts of the slab are cut away to show the interior construction.

Figure 12:
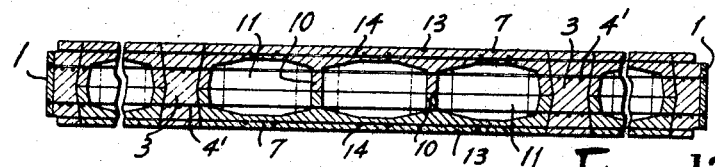
FIGURE 12 is a sectional view in elevation of a slab in which pre-cast elements are used to form the recesses.
Figure 13:
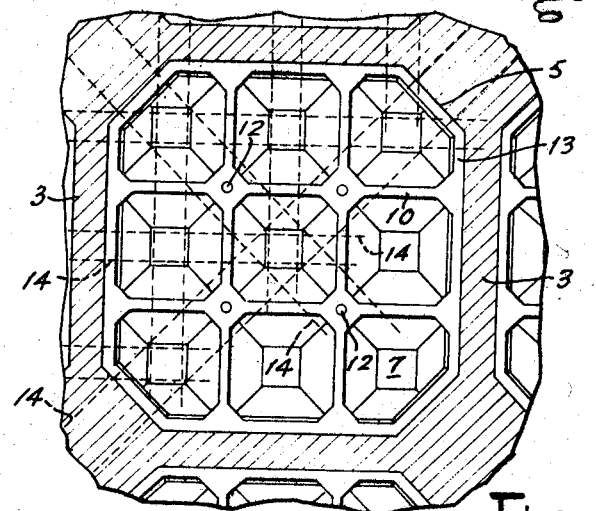
FIGURE 13 is a plan view of a pre-cast element in FIG. 12.

The present invention contemplates another method for making hollow slabs as shown in FIGS. 12 to 14.

In this method, the recesses are separated into several chambers 11 to prevent air circulation for the purpose of providing high insulation efficiency. The hollow recesses are formed by placing two recessed precast concrete pieces 13 in tightly facing confronted relation.

Each recess is provided with a plurality of partition walls 10 to define the chambers 11 which are of similar dimension. The partition walls 10 may extend along the diagonals as shown in FIG. 15.

The partition walls 10 are enlarged where they intersect and bolt holes 12 are formed thereat.

The recessed precast concrete pieces 13 of the same size and shape are secured together with common reinforcement bars 14, and pairs of pieces 13 are tightly engaged in facing relation using bolts in the bolt holes 12, some cement mortar being added to the end surfaces of the partition walls such that the small chambers 11 are separated in airtight manner.

The compartmentalized recesses are arranged in spaced relation as shown in FIG. 14 between wires 4', and the latter are then subjected to tension pre-stress by the anchor plates 1. Then the concrete is poured in the forms of the slab and a hollow pre-stressed slab is produced.

The anchoring plates 1, to which the ends of the reinforcing wires are secured, may be of the shape shown in FIGS. 15 to 20, wherein a T-shaped member is shown. The anchoring plates may also be of channel shape.

Generally, the ends of the wires are fixed to the anchoring plates in two rows 41. The T-shaped anchoring plates have flanges 15 extending perpendicularly between the outer surfaces of the slab and projecting outwardly of the ends of the wires.

These projecting flanges of the anchoring plates are used for connecting the slabs as walls, floors or roofs of structures, and the flanges effectively resist bending moments as it is placed perpendicularly to the two rows 41 of the wires 41'. The flanges 15 also serve to apply high tensile stress to the wires 4', as well as to attach the hooks of cranes or derricks to lift the slabs for erecting purposes.

The outwardly projecting vertical flanges 15 are provided with bolt holes 16, by means of which the cranes or derricks (not shown in the drawings), can be engaged in the holes 16 to lift the slabs or a jack can be engaged in holes 16 and a tension is applied to the flanges and the anchoring plates, and thereby also to the wires 4'. Then the precast hollow blocks are placed between the wires, and concrete is poured in the forms of the slab as described above.

To erect the slabs as structural members, a hook of a crane or derrick is attached to a vertical flange 15, and the slab is lifted and installed as a wall or floor.

At the peripheries of the slabs, longitudinal cutouts 17 are formed for a height of one-quarter of the thickness of the slab leaving a central projecting portion 18 which is half the thickness of the slab. Thus there are made notches in the lateral bounding edges with the central projecting portion 18.

The vertical projecting flanges 15 of the anchoring plates 1 have the same height as central portion 18 and are at the same level thereof. The flanges are spaced along the edges at equal intervals.

Figure 19:
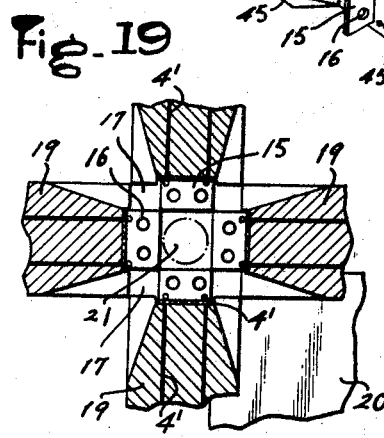
FIGURE 19 is a diagrammatic showing in plan view of the connection between four wall slabs and a floor slab.

There are shown four types of connecting details for the slabs. One of these connections is shown in FIG. 19 wherein four slabs, forming walls, meet at a common intersection to form an assembly of X shape. A floor 20 can be connected to the assembly, as for example, shown in FIG. 19.

Figure 20:
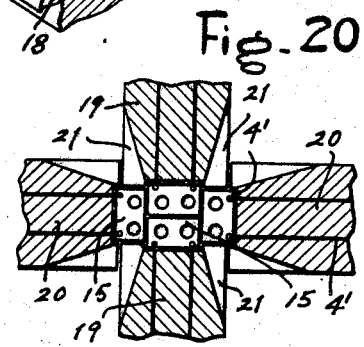
FIGURE 20 is a diagrammatic sectional view showing the connection between two wall slabs and two floor slabs.

The second type of connecting detail is shown in FIG. 20, in which a section view is shown in which two vertical slabs forming walls are connected with two horizontal floor slabs 20 to form an X-shape assembly.

In the arrangement in FIG. 19, the cutouts 17 enable interfitting of the slabs at their edges, so that the flanges 15 of the various slabs approach each other closely, and can be secured by steel members (not shown) by any conventional method of steel connection. Thereby, the rods 4' in the ribs of each slab are effectively connected to each other. In this arrangement a central vacant space 21 (FIG. 19) is formed which can serve for the accommodation of pipings or ducts.

In the arrangement of FIG. 19 the four walls are mutually connected in X arrangement as described above. However, when they form a T or L intersection, the connections are simplified and some parts may be eliminated. When a floor slab 20 is connected to a corner of the wall slab 19, it is secured as shown in hatched outline in FIG. 19. If it is necessary to join the slabs in several corners it will be effected in the same manner.

In the case in which the wall slabs and floor slabs intersect as in FIG. 20, the central projections 19 at the peripheries of the slabs 20 are interfitted by penetrating into the cutouts 17 as in the arrangement in FIG. 19.

As described above, the anchoring plates 1 are placed at fixed intervals in the peripheries of the slabs, the flanges 15 in the center of the plates also being located at fixed intervals. Thereby, the flanges 15 in FIGS. 19 and 20 are arranged in a single plane, and can be easily connected by conventional methods of steel connection directly, or by use of additional elements.

Figure 18:
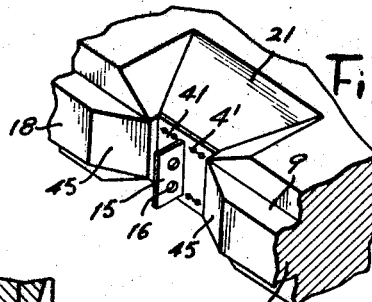
FIGURE 18 is a perspective view of a part of the portion shown in FIG. 16.

When the slabs are assembled in intersecting manner as shown in FIGS. 19 and 20, the connecting elements are fully surrounded by the four slabs, and in order to provide access to connect the slabs, inclined faces 21 are formed in the region of plates 1 as shown in FIG. 18. When the connections have been made between the anchoring plates 1, temporary forms are installed in the spaces formed by the inclined surfaces and such forms are filled with concrete.

Figure 21:
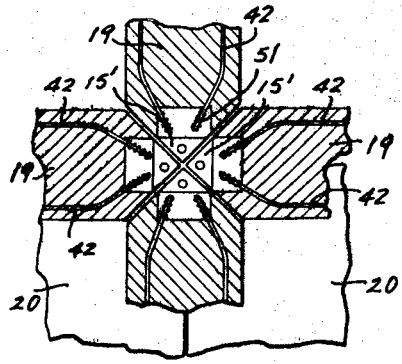
FIGURE 21 is a diagrammatic partially sectioned plan view of another mode of connection between four wall slabs and two floor slabs.
Figure 22:
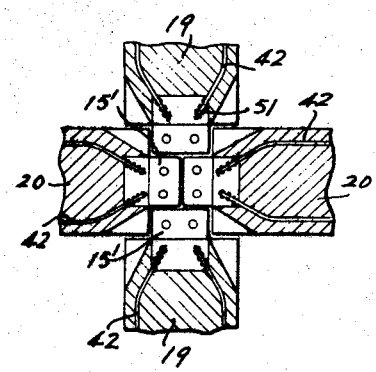
FIGURE 22 is a diagrammatic sectional view showing the connection between two wall slabs and two floor slabs.

Other similar connecting methods are shown in FIG. 21 and FIG. 22, and in FIG. 21 four wall slabs 19 are connected more closely to each other than in the case of FIG. 19. In this case the peripheral corners of the slabs and the anchoring plates 15' are inclined 45 degrees as shown in the drawings to make a close joint, and two floor slabs are assembled thereto.

In the example shown in FIG. 22, the two floor slabs are situated on the lower wall slab 19 and the upper wall slab 19 are on the floor slabs.

Since the prestressed high tension wires are not necessary when the dimensions of the slabs are not so large, ordinary steel bars without pre-stress may sometimes be used only for the reinforcements.

In such cases, the anchor plates 15' are used instead of the T-shaped plates 15, and the main reinforcement bars 42 in the ribs are welded at their ends to the connecting plates 15' as shown in FIGS. 21–25.

In these cases, each end of the ordinary reinforcement bars is slightly curved near their ends so that it may fit closely to the connecting anchoring plates 15' to form the weldings 51.

As the dimensions and the interval distances of the anchoring plates 15' are equal to those of the projected flanges 15 of the T-shaped anchoring plates in the prescribed examples, these small sized slabs with ordinary reinforcements can be easily connected to the prestressed slabs if necesary, and those two types of the slabs may be combined.

Figure 23:
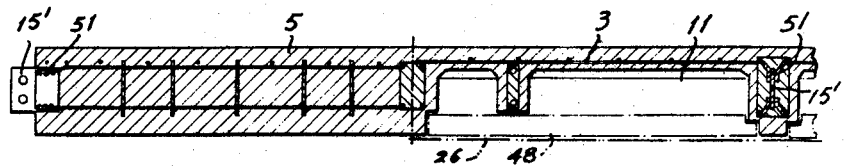
FIGURE 23 is a sectional view in elevation of a slab in which an anchoring plate is connected with conventional reinforcements.
Figure 24:
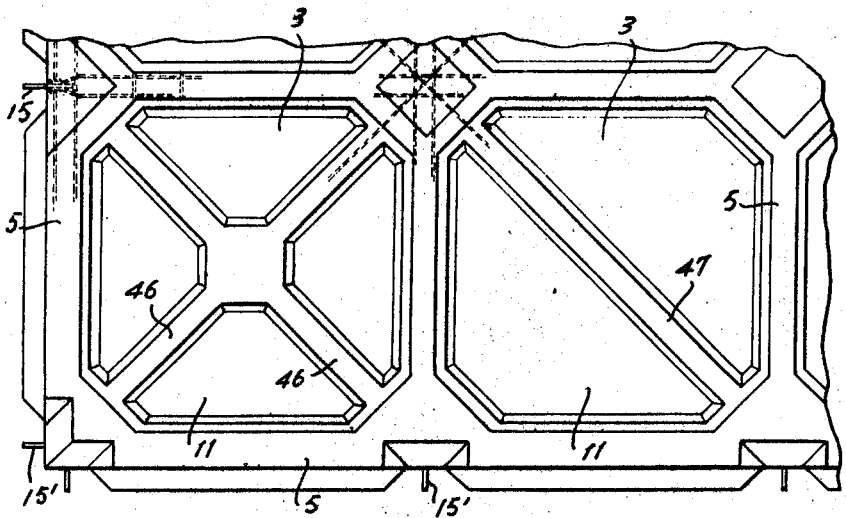
FIGURE 24 is a plan view of FIG. 23.
Figure 25:
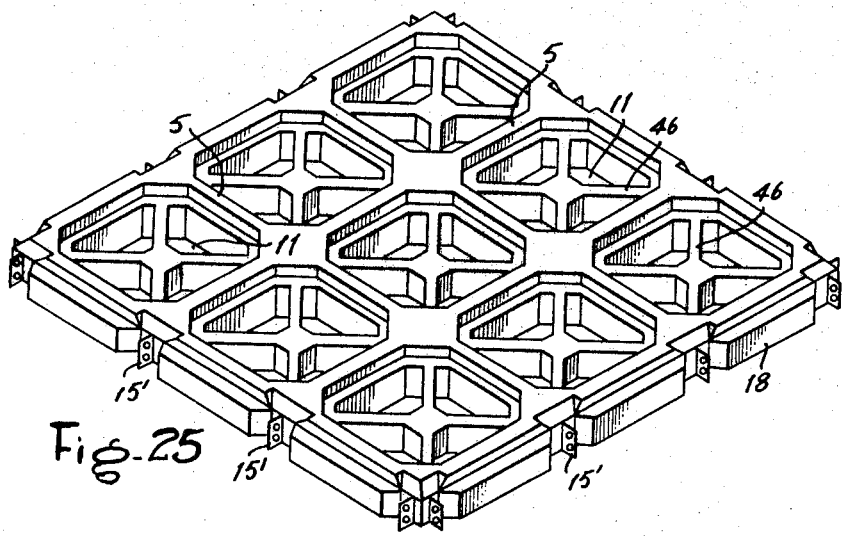
FIGURE 25 is a perspective view of another modified version.

Notwithstanding the anchoring plate or the conditions of the reinforcements, whether the wires or the reinforcements are pre-stressed or not, the diagonal ribs 46 in X shape, or single diagonals 47 may also be attached to the thin portion 3, besides the ribs 5 as shown in FIGS. 23, 24 and 25.

And thin concrete plates 48, possibly made of lightweight concrete, or thinner finishing board 26 are attached to the side opposite to the thin portion 3 to form hollow chamber 11, as shown in the drawings.

These lightweight slabs of this invention have been explained as being useful in building constructions, but they can also be used for air conditioning purposes or, heat or noise insulation purposes.

Figure 26:
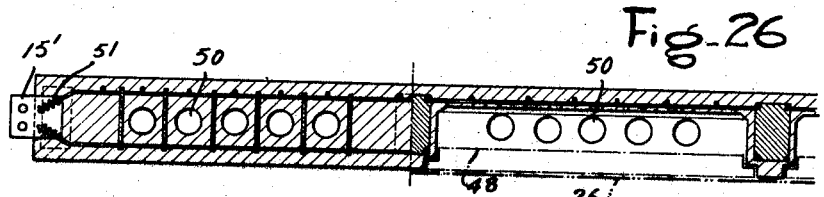
FIGURE 26 is a sectional view in elevation of a slab in which the slabs are used as air-conditioning ducts.
Figure 27:
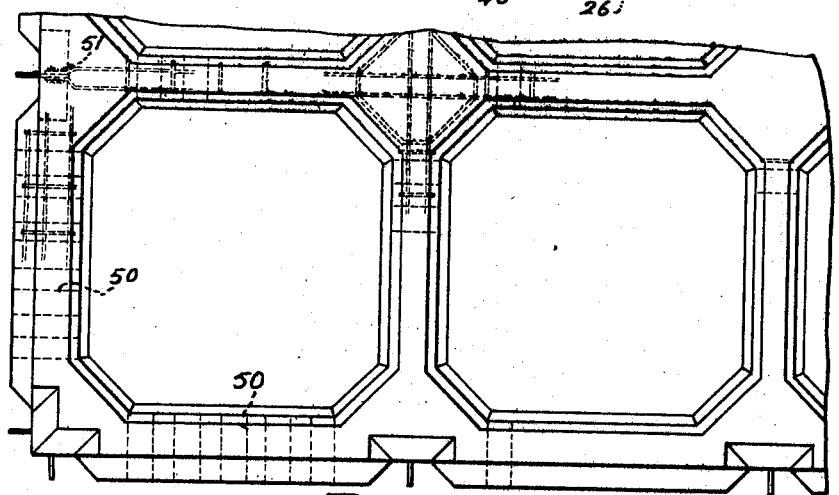
FIGURE 27 is a plan view of the slabs shown in FIG. 26.
Figure 28:
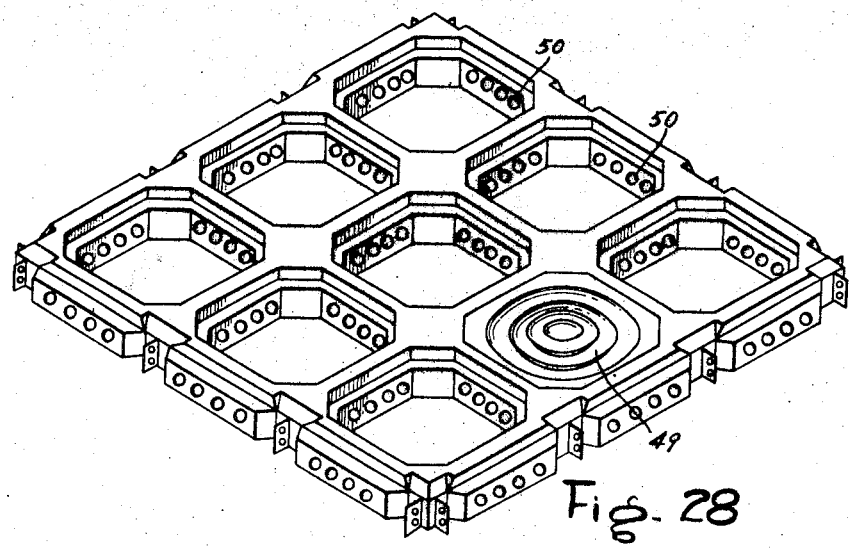
FIGURE 28 is a perspective view of the slabs shown in FIGS. 26 and 27.

In the case when the hollow slabs are also used as air-conditioning ducts, many holes 50 are formed in the webs of the ribs of the slabs as shown in FIGS. 26, 27 and 28, and an air outlet 49 may be attached at some required places instead of lightweight plates 48 or finishing board 26.

In FIG. 28, the recesses of the slabs are shown as identical to those of FIG. 4, but the upper plane of the slabs in this case must be covered closely except for the air outlet 49.

Or, in another example, the hot water pipings may be installed through the holes 50 and the slabs may also be used for panel heating.

When these slabs are used for both constructions and duct purposes, the connection methods as mentioned above are operative, and in the case of FIG. 19, the center vacant vertical hole 21 may be able to serve as the main duct of the air-conditioning.

When the hollow precast concrete slabs are formed by using two similar recessed concrete pieces 13 (FIGS. 12–15), insulation boards 40 (FIG. 29) are inserted between the pieces, if the resulting hollow slabs are desired to have increased insulation capability with regard to heat and noise, as for example, in walls and floors of houses.

Figure 29:
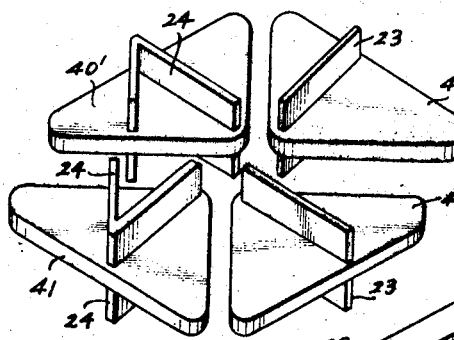
FIGURES 29 and 30 are perspective views respectively of an insulation element, and a pre-cast block which receives the insulation element and which forms a recess in the slab.
Figure 30:
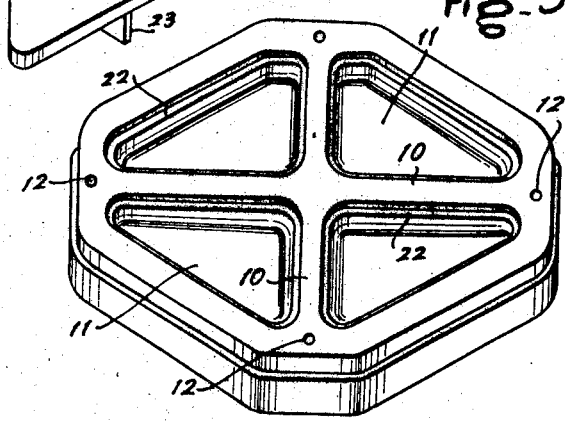

According to the example in FIGS. 29 and 30, the recesses of the precast pieces are divided into four chambers 11 by diagonal partitions 10.

The inner edges in the peripheral walls of the pieces 13, and the side edges of the partition wall 10 are formed with small stepped portions 22 which surround the recessed compartments 11.

The insulation boards 40 have a similar shape to that of the chambers 11, and rest with their edges on the stepped portion 22. The boards 40 are made of insulating material, such as for example, polystyrene or the like.

At the upper and lower surfaces of the insulation boards 40, are walls 23 and 24 which have a height corresponding to the depth of the compartments 11 in the precast concrete pieces 13.

Two arrangements for the walls on the boards 11 are shown. The two insulation boards 40 at the right side in FIG. 21 have only one wall 23 on each side of the boards, and the insulation boards 40 at the left side have double walls 24, to further compartmentalize the chambers 11.

Before the precast concrete pieces 13 of similar shape are tightly engaged in facing confronting relation with the bolts, the insulation boards are inserted between the pieces, the edges of the insulation boards resting in the stepped portions 22, as indicated by the dotted lines. When the bolts are installed in holes 12, hollow precast concrete blocks with high insulation properties are obtained.

When the slabs 2 as described above, are used as inner walls and ceilings of buildings, the recesses as shown in FIG. 4 may be utilized for the purposes of decoration. Generally, however, the recesses are not exposed and both sides of the slabs are covered with flat elements.

Pieces 25 of wood or the like are integrally cast in the concrete as shown in FIG. 4, to enable flat finishing boards or insulation boards to be secured to the slab surfaces by suitable connectors such as nails or the like.

Figure 37:
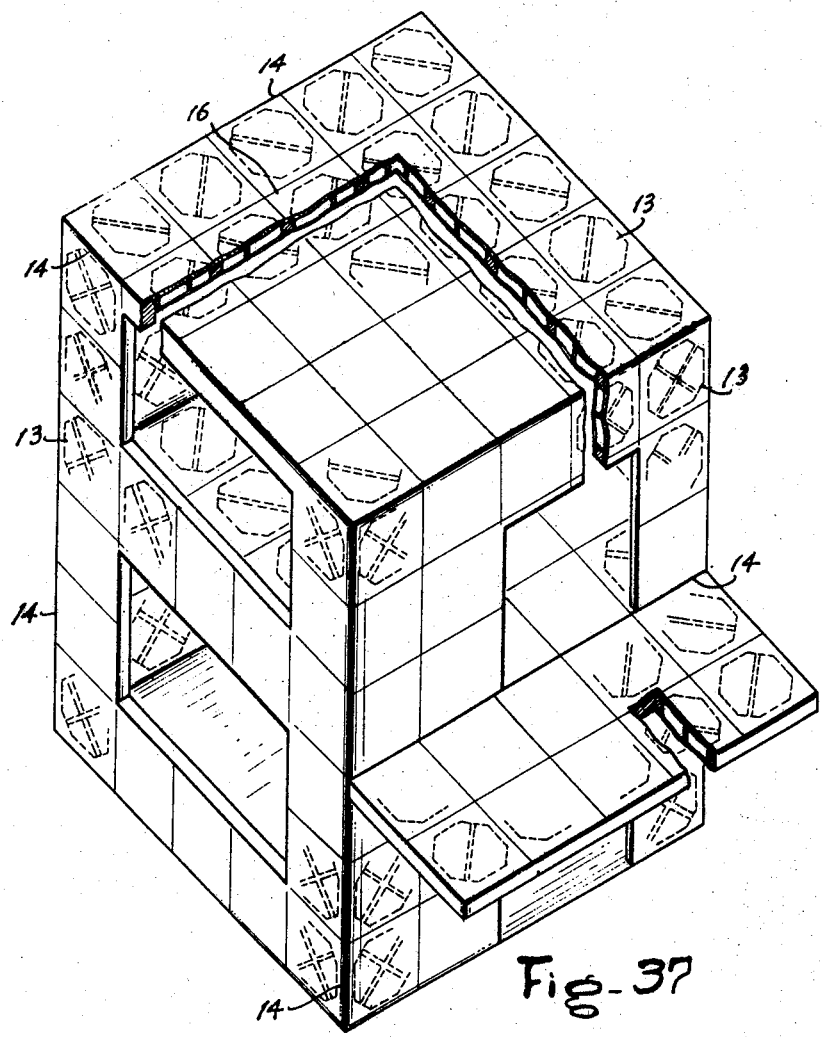
FIGURE 37 is a perspective view of another assembly of the slabs according to the invention.

In order to use the prefabricated concrete slabs as walls and floors of buildings as shown in FIG. 37, numerous openings must be formed for windows, doors, staircases, elevators or such, and these are prepared when the slabs are fabricated.

As seen in FIG. 31, there is shown a form for a slab in which an opening 27 is formed by a frame. The frame of the opening 27 must not be strained or deformed by the tension in the reinforcing wires. Such frame is strengthened by reinforcing members 28 at the periphery of the opening, and rigid bars 30 are connected by strong bolts 29 to the members 28 to provide reinforcement in the opening in the form, so that the forms of the opening will not be deformed on account of the pre-stressed tension in the wires when slabs with openings are fabricated.

Figure 34:
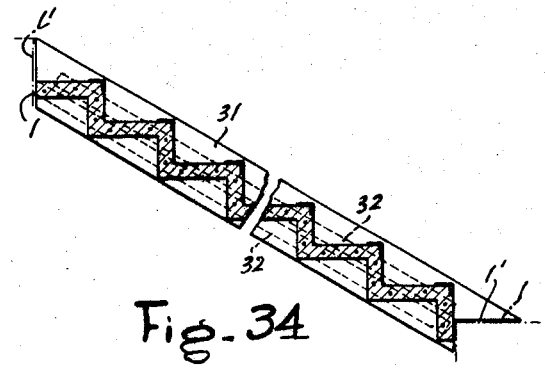
FIGURE 34 is a side sectional view of the staircase of FIG. 33.
Figure 35:
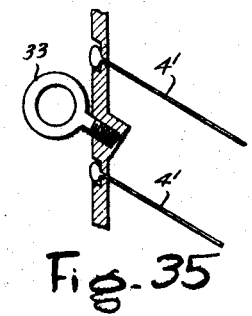
FIGURE 35 shows a detail for pre-stressing reinforcing wires when the anchoring plates are inclined.

To form a pre-stressed staircase as shown in FIGS. 33–35, on both outer sides of inclined beam 31, there are secured continuous anchoring plates 32, and the pre-stressed wires 4' in the steps are fixed to the plates.

The pre-stressed wires of the inclined beams 31, are subjected to tension forces which are inclined relative to the anchoring plates 1' in FIG. 4 by special means, for example, using ring 33 (FIG. 35) or using the vertical flange projecting outward form the plates 1' with inclined stressing apparatus (not shown in the drawings). When this precast concrete staircase is secured to other slabs in a building the anchoring plates are connected to each other as shown in phantom lines in FIG. 34.

To erect the above described precast concrete slabs as the walls and floors of buildings, two modes of connection are shown in the drawings.

Figure 36:
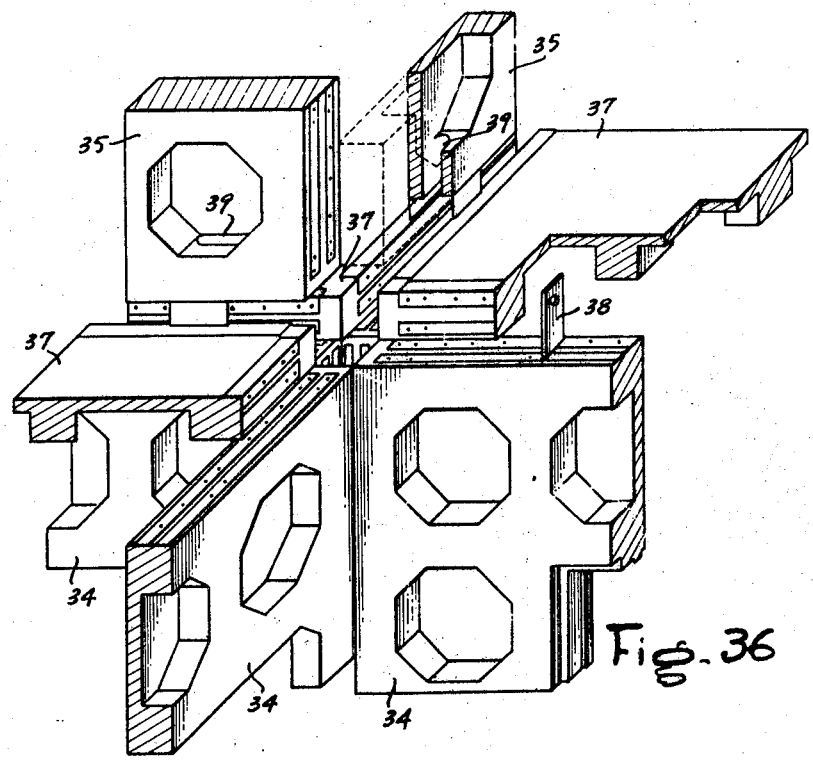
FIGURE 36 is a perspective view of an assembly of the slabs according to the invention.

One of them is directed to the case when the wires 4 are provided in the thin bottom 3 of the slabs, as shown in FIG. 36, and the other to the case in which only the reinforcing wires 4' are provided in the ribs and the precast hollow elements are placed between the ribs, as shown in FIG. 37.

In the case of FIG. 36, the walls 34 in a lower floor, the walls 35 in the next upper floor, and the floor slabs 37 are shown and each of them extend perpendicularly to one another.

At the periphery of said slabs, the anchoring plates thereof are secured together directly or by means of additional members 38 which may be welded to the anchoring plate of the slabs.

The member 38 may first be welded to the upper periphery of the wall slab 34 so that the hook of a crane or derrick may lift such slab for the purpose of its erection.

When the slabs 37 are placed on the walls, the anchoring plates 1 are welded directly or welded via member 38, and thereafter the walls 35 are erected on the assembly. The anchoring plates at the peripheries of the slabs are welded together. Thereafter, forms are installed at the connecting parts and, concrete is poured through holes 39 which are formed near the edge of the wall slabs.

In FIG. 37, the slabs have the vertically projecting flanges 15 and 15' as shown in FIGS. 15–28, and by which the slabs are secured together.

In FIG. 37, parts of the floors and walls are cut away to show their inner construction.

As shown in FIG. 37, the exampled house in drawings is made by an assembly of small ribs with recessed thin portions which forms roofs, floors and walls in the style of box-frame constructions.

The house shown in FIG. 37 is thus constructed by the network assembly of equal small ribs of the same length, in ways; horizontally and vertically.

Thus, the lightweight prefabricated concrete slabs with ribs can be used to fabricate buildings very economically, because the slabs require minimum quantities of concrete and yet have high structural efficiency and outstanding insulation properties.

The details of making the slabs or their connecting methods may be modified substantially without departing from the spirit of the invention if defined by the appended claims.

What is claimed is:

1. A structural assembly comprising at least two connected cast slabs each having opposite outer surfaces and lateral bounding edges, said lateral bounding edges having notches therein, each said slab having a plurality of rows of recesses formed therein which define intersecting solid rib sections which extend between said edges, a plurality of stressed reinforcement means in said rib sections extending substantially the entire length thereof, and connection means having portions embedded in the slab at said lateral edges and secured to the reinforcement means at the ends thereof reacting the stress of the reinforcement means, said connection means being recessed in said notches at the respective lateral edges and including means for external connection of the slab, said slabs being interconnected by respective interengagement of the latter said means of said connection means.

2. A member as claimed in claim 1 wherein said recesses define a relatively thin section of the slab with one of the outer surfaces, said member further comprising additional reinforcement means in said thin section extending between said bounding edges.

3. A member as claimed in claim 1 comprising means forming isolated compartments in each recess.

4. A member as claimed in claim 1 wherein said slab is a polyhedron and said edges are arranged as parallel pairs, the reinforcement means extending between parallel pairs of edges.

5. A member as claimed in claim 1 comprising means integrally in said cast slab enabling attachment thereto of a cover member for said slab.

6. A member as claimed in claim 1 comprising a cover member for at least one of said surfaces integrally cast with said slab.

7. A member as claimed in claim 1 wherein said connection means comprises regularly spaced elements secured to the reinforcement means in respective rib sections.

8. A member as claimed in claim 1 wherein said connection means is inclined with regard to said reinforcement means, thereby enabling said slab to constitute a reinforcing beam for a staircase.

9. A member as claimed in claim 1 wherein said rib sections are provided with holes which transversely pass through said rib sections.

10. A member as claimed in claim 1 wherein said plurality of reinforcement means comprises a plurality of reinforcing rods.

11. A member as claimed in claim 10 wherein said connection means comprises at least one anchoring plate disposed substantially perpendicularly to the slab surfaces, and said reinforcing rods are secured to said plate.

12. A member as claimed in claim 1 wherein said slab is provided with cutouts along said edges, said cutouts extending from the outer surfaces to a depth of about one-quarter the thickness of the slab to provide a remaining central projection at said edges of half the thickness of the slab.

13. A member as claimed in claim 12 wherein said connection means comprises structural elements having a height of one-half the thickness of the slab and disposed at the level of the central projections.

14. A member as claimed in claim 13 wherein said structural elements include flanges extending perpendicularly between said outer surfaces and projecting in said notches a distance to be in alignment with the contour of the central projections.

15. A member as claimed in claim 1 wherein said slab comprises precast elements which define said recesses.

16. A member as claimed in claim 15 wherein said recesses are wholly enclosed within said outer surfaces of the slab, said precast elements being constituted by pairs of precast pieces each defining a recess, said pieces of each pair being secured in face-to-face confronting relation.

17. A member as claimed in claim 16 wherein said precast elements include partition walls dividing said recesses into isolated chambers, and insulation members secured between said pieces of each pair at each chamber.

18. A member as claimed in claim 16 comprising insulation members between said pieces of each pair.

19. A member as claimed in claim 18 comprising walls on said insulation members extending into said recesses and dividing the same into compartments.

20. A member as claimed in claim 19 wherein said walls extend the full depth of said recesses.

References Cited

UNITED STATES PATENTS

| | | | |
|---|---|---|---|
| 3,195,277 | 7/1965 | Greulich | 52—337 |
| 2,053,873 | 9/1936 | Niederhofer | 52—602 |
| 2,273,775 | 2/1942 | Strong | 52—583 |
| 2,534,580 | 12/1950 | Edwards | 52—307 |
| 2,592,634 | 4/1952 | Wilson | 52—583 |
| 2,635,450 | 4/1953 | Orzel | 52—583 |
| 2,892,339 | 6/1959 | Flower et al. | 52—608 |
| 3,136,092 | 6/1964 | Contini | 52—283 |
| 3,152,421 | 10/1964 | Middendorf | 52—223 |
| 3,229,437 | 1/1966 | Adie | 52—576 |

FOREIGN PATENTS

| | | |
|---|---|---|
| 18,177 | 8/1909 | Great Britain. |
| 999,461 | 10/1951 | France. |
| 1,024,029 | 1/1953 | France. |
| 825,593 | 12/1951 | Germany. |
| 840,142 | 5/1952 | Germany. |
| 381,631 | 7/1940 | Italy. |

OTHER REFERENCES

Engineering News Record, publication, Mar. 2, 1950, pp. 34–37.

HENRY C. SUTHERLAND, Primary Examiner

JAMES L. RIDGILL, JR., Assistant Examiner

U.S. Cl. X.R.

52—405, 576, 577, 587, 602